US008024384B2

(12) United States Patent
Prabhakar et al.

(10) Patent No.: US 8,024,384 B2
(45) Date of Patent: *Sep. 20, 2011

(54) TECHNIQUES FOR CRAWLING DYNAMIC WEB CONTENT

(75) Inventors: Bangalore Subbaramaiah Prabhakar, Bangalore (IN); Shivakumar Ganesan, Chennai (IN); Yarram Sunil Kumar, Bangalore (IN); Shreekanth Karvaje, Karnataka (IN); Binu Raj, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 333 days.

This patent is subject to a terminal disclaimer.

(21) Appl. No.: 12/422,571

(22) Filed: Apr. 13, 2009

(65) Prior Publication Data

US 2009/0198662 A1    Aug. 6, 2009

Related U.S. Application Data

(63) Continuation of application No. 11/064,278, filed on Feb. 22, 2005, now Pat. No. 7,536,389.

(51) Int. Cl.
*G06F 17/30* (2006.01)
(52) U.S. Cl. .................. 707/920; 701/200; 709/203
(58) Field of Classification Search .................. 707/609, 707/705, 769, 802, 920; 701/200; 709/203, 709/205
See application file for complete search history.

(56) References Cited

U.S. PATENT DOCUMENTS

| | | | |
|---|---|---|---|
| 5,978,847 A | 11/1999 | Kisor et al. | |
| 6,064,952 A | 5/2000 | Imanaka et al. | |
| 6,615,226 B1 | 9/2003 | Hartman et al. | |
| 6,871,213 B1 * | 3/2005 | Graham et al. | 709/205 |
| 7,343,551 B1 | 3/2008 | Bourdev | |
| 7,644,350 B2 | 1/2010 | Piersol | |
| 2002/0078136 A1 * | 6/2002 | Brodsky et al. | 709/203 |
| 2002/0083068 A1 * | 6/2002 | Quass et al. | 707/100 |
| 2005/0108625 A1 | 5/2005 | Bhogal et al. | |
| 2005/0120060 A1 * | 6/2005 | Meng | 707/202 |
| 2006/0294052 A1 * | 12/2006 | Kulkami et al. | 707/1 |
| 2008/0097958 A1 | 4/2008 | Ntoulas et al. | |
| 2008/0184102 A1 | 7/2008 | Selig | |

OTHER PUBLICATIONS

Hedley, Y.L., et al. Query-Related Data Extraction of Hidden Web Documents, Jul. 25-29, 2004; SIGIR '04, Annual ACM Conference on Research and Development in Information Retrieval.

* cited by examiner

*Primary Examiner* — Fred I Ehichioya
(74) *Attorney, Agent, or Firm* — Hickman Palermo Truong & Becker LLP; Christian A. Nicholes; Karl T. Rees (57) ABSTRACT

An automated form filler and script executor is integrated with a web browser engine, which is communicatively coupled to a web crawler, thereby enabling the crawler to identify dynamic web content based on submission of forms completed by the form filler. The crawler is capable of identifying web pages containing forms that require submission, and JavaScript code that requires execution, respectively, for requesting dynamic web content from a server. The form filler systematically completes the form based on various combinations of search parameter values provided by the web page for requesting dynamic content. Duplicate forms are detected, so that the crawler does not unnecessarily re-process forms that are similar to forms that have already been processed. The crawler may also determine which JavaScript links in a page are relevant for execution, so as to avoid unnecessary execution of irrelevant JavaScript links.

28 Claims, 3 Drawing Sheets

TECHNIQUES FOR CRAWLING DYNAMIC WEB CONTENT

PRIORITY CLAIM

This application claims benefit under 35 U.S.C. §120 as a Continuation of application Ser. No. 11/064,278, filed Feb. 22, 2005 now U.S. Pat. No. 7,536,389. The entire contents of application Ser. No. 11/064,278 are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to computer networks and, more particularly, to techniques for identifying dynamic World Wide Web content for indexing by a search engine, i.e., "crawling" dynamic web content.

BACKGROUND OF THE INVENTION

World Wide Web—General

The Internet is a worldwide system of computer networks and is a public, self-sustaining facility that is accessible to tens of millions of people worldwide. The most widely used part of the Internet is the World Wide Web, often abbreviated "WWW" or simply referred to as just "the web". The web is an Internet service that organizes information through the use of hypermedia. The HyperText Markup Language ("HTML") is typically used to specify the contents and format of a hypermedia document (e.g., a web page).

In this context, an HTML file is a file that contains the source code for a particular web page. A web page is the image or collection of images that is displayed to a user when a particular HTML file is rendered by a browser application program. Unless specifically stated, an electronic or web document may refer to either the source code for a particular web page or the web page itself. Each page can contain embedded references to images, audio, video or other web documents. The most common type of reference used to identify and locate resources on the Internet is the Uniform Resource Locator, or URL. In the context of the web, a user, using a web browser, browses for information by following references that are embedded in each of the documents. The HyperText Transfer Protocol ("HTTP") is the protocol used to access a web document and the references that are based on HTTP are referred to as hyperlinks (formerly, "hypertext links").

Static web content generally refers to web content that is fixed and not capable of action or change. A web site that is static can only supply information that is written into the HTML source code and this information will not change unless the change is written into the source code. When a web browser requests the specific static web page, a server returns the page to the browser and the user only gets whatever information is contained in the HTML code. In contrast, a dynamic web page contains dynamically-generated content that is returned by a server based on a user's request, such as information that is stored in a database associated with the server. The user can request that information be retrieved from a database based on user input parameters.

The most common mechanisms for providing input for a dynamic web page in order to retrieve dynamic web content are HTML forms and Java Script links. HTML forms are described in Section 17 (entitled "Forms") of the W3C Recommendation entitled "HTML 4.01 Specification", available from the W3C® organization; the content of which is incorporated by this reference in its entirety for all purposes as if fully disclosed herein.

Search Engines

Through the use of the web, individuals have access to millions of pages of information. However a significant drawback with using the web is that because there is so little organization to the web, at times it can be extremely difficult for users to locate the particular pages that contain the information that is of interest to them. To address this problem, a mechanism known as a "search engine" has been developed to index a large number of web pages and to provide an interface that can be used to search the indexed information by entering certain words or phases to be queried. These search terms are often referred to as "keywords".

Indexes used by search engines are conceptually similar to the normal indexes that are typically found at the end of a book, in that both kinds of indexes comprise an ordered list of information accompanied with the location of the information. An "index word set" of a document is the set of words that are mapped to the document, in an index. For example, an index word set of a web page is the set of words that are mapped to the web page, in an index. For documents that are not indexed, the index word set is empty.

Although there are many popular Internet search engines, they are generally constructed using the same three common parts. First, each search engine has at least one, but typically more, "web crawler" (also referred to as "crawler", "spider", "robot") that "crawls" across the Internet in a methodical and automated manner to locate web documents around the world. Upon locating a document, the crawler stores the document's URL, and follows any hyperlinks associated with the document to locate other web documents. Second, each search engine contains an indexing mechanism that indexes certain information about the documents that were located by the crawler. In general, index information is generated based on the contents of the HTML file associated with the document. The indexing mechanism stores the index information in large databases that can typically hold an enormous amount of information. Third, each search engine provides a search tool that allows users, through a user interface, to search the databases in order to locate specific documents, and their location on the web (e.g., a URL), that contain information that is of interest to them.

The search engine interface allows users to specify their search criteria (e.g., keywords) and, after performing a search, an interface for displaying the search results. Typically, the search engine orders the search results prior to presenting the search results interface to the user. The order usually takes the form of a "ranking", where the document with the highest ranking is the document considered most likely to satisfy the interest reflected in the search criteria specified by the user. Once the matching documents have been determined, and the display order of those documents has been determined, the search engine sends to the user that issued the search a "search results page" that presents information about the matching documents in the selected display order.

Web Crawlers

There are many web crawlers that crawl and store content from the web. The web is becoming more dynamic by the day, and a larger share of the content is only accessible from behind Flash (a vector-graphic animation technology), HTML forms, JavaScript links, etc. There is no readily available technique for a crawler to get past HTML forms, which are meant primarily for real users, and JavaScript content, which are written with browsers in mind, in order to access the dynamic web content behind the HTML forms and Java Scripts. Consequently, a basic crawler gets only the static content of the web, but fails to crawl dynamic content, also referred to as the "deep web" and the "invisible web".

For domain-specific crawlers (also referred to as "vertical crawlers") to access dynamic content, the crawlers typically must have some mechanism to fill out forms and follow JavaScript links. For instance, in the jobs domain, most job postings are requested by submitting HTML forms. Possible approaches to identifying and submitting forms, for vertically crawling a given web site, include manual approaches, in which a human supplies the information for the crawler to use to fill in the forms used by the web site. The human examines each web site that requires form-filling, and provides information in a script or configuration file, instructing the crawler how to fill each form on the site. Manual approaches are labor intensive and not easily scalable.

Some shortcomings associated with the manual approaches are as follows.

(1) Scripts and configuration files are site specific. It would be a complex and expensive manual process to write these configurations for all the domain-specific sites on the web.

(2) Configuration files have to be rewritten if the site structure changes. That is, if the HTML form is changed or the web site itself has changed, these configuration files must be manually rewritten.

(3) JavaScript-based forms or links are extremely difficult to manually identify. For some web sites, execution of Java Script functions is necessary to submit forms or to generate the link to the next page. These JavaScript functions could involve a considerable amount of code, which makes it difficult to manually identify and interpret the code for the form submission logic.

Based on the foregoing, there is a need for improved techniques for crawling dynamic web content.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Techniques are described for automatically crawling dynamic web content. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview of Embodiments

An automated form filler is integrated with a web browser engine, which is communicatively coupled to a web crawler, thereby enabling the crawler to identify dynamic web content based on submission of forms completed by the form filler. The form filler may be, for example, (1) a mechanism for completing (i.e., "filling in") and submitting an HTML form, and/or (2) a mechanism for executing JavaScript form submission code, and/or (3) a mechanism for executing JavaScript functions that lead to a simple url/link being fetched, without a form being involved. The crawler is capable of identifying web pages containing forms that require submission, and JavaScript form submission code that requires execution, respectively, for requesting dynamic web content from a server. The crawler passes a representation of such web pages to the browser engine.

In the case of an HTML form, the browser engine systematically and repeatedly completes the form based on various combinations of search parameter values. In one embodiment, the values used to fill in the form presented by a web page are obtained from the web page itself. For example, the browser engine constructs request messages to the host server based on combinations of the various options presented for the web page form's controls, such as list boxes, checkboxes, radio buttons, and the like. Further, in the case of JavaScript-enhanced forms and/or form submission JavaScript, the browser engine executes the JavaScript code in association with search parameter values, to construct request messages to the host server.

In both of the foregoing cases, a set of dynamic content request messages (i.e., form submissions) is constructed. Generally, each message includes (1) the URL/URI of the host server that services such a request, along with (2) search parameter value(s) relative to particular dynamic content hosted by the server (e.g., an encoded form data set). An encoded form data set may be part of a URL/URI, such as when the form submission HTML code includes a METHOD="GET" command. Further, an encoded form data set may be part of an HTTP POST transaction using a request message to a form-specific URL/URI for the server, such as when the form submission HTML code includes a METHOD="POST" command. Further, the cookies associated with each URI may also be part of the data associated with the URL/URI.

The request messages that are prepared by the browser engine are passed to the crawler for submission to the server. The dynamic content, received by the crawler from the server in response to the request, can be indexed according to conventional search engine indexing techniques. Consequently, when a user submits a search request through the search engine, the search engine is capable of responding to the search request by returning links to static content, as well as prepared links (i.e., links that include an encoded form data set) to dynamic content based on the dynamic content that is indexed by the crawler.

In some scenarios, links to dynamic content can lead to "dead links". A dead link is either an HTTP 404 error page or a redirect to a general page on the web site containing the dynamic content. Dead links are usually due to an unfulfilled cookie requirement or session identifier requirement, or some other such "state" information. Thus, for example, to visit the dynamic content the user's browser has to visit some previous page (a "pre-requisite URL"), which issues the cookie required to visit the page containing the dynamic content. To address this issue, the pre-requisite URL is identified and stored along with the link to the dynamic page. Consequently, this information can be used by the search web page to avoid such dead links, by visiting the pre-requisite URL behind the scenes (e.g., using a hidden frame or other such mechanisms), before visiting the dynamic page the user wants to see.

System Architecture

Figure 1:
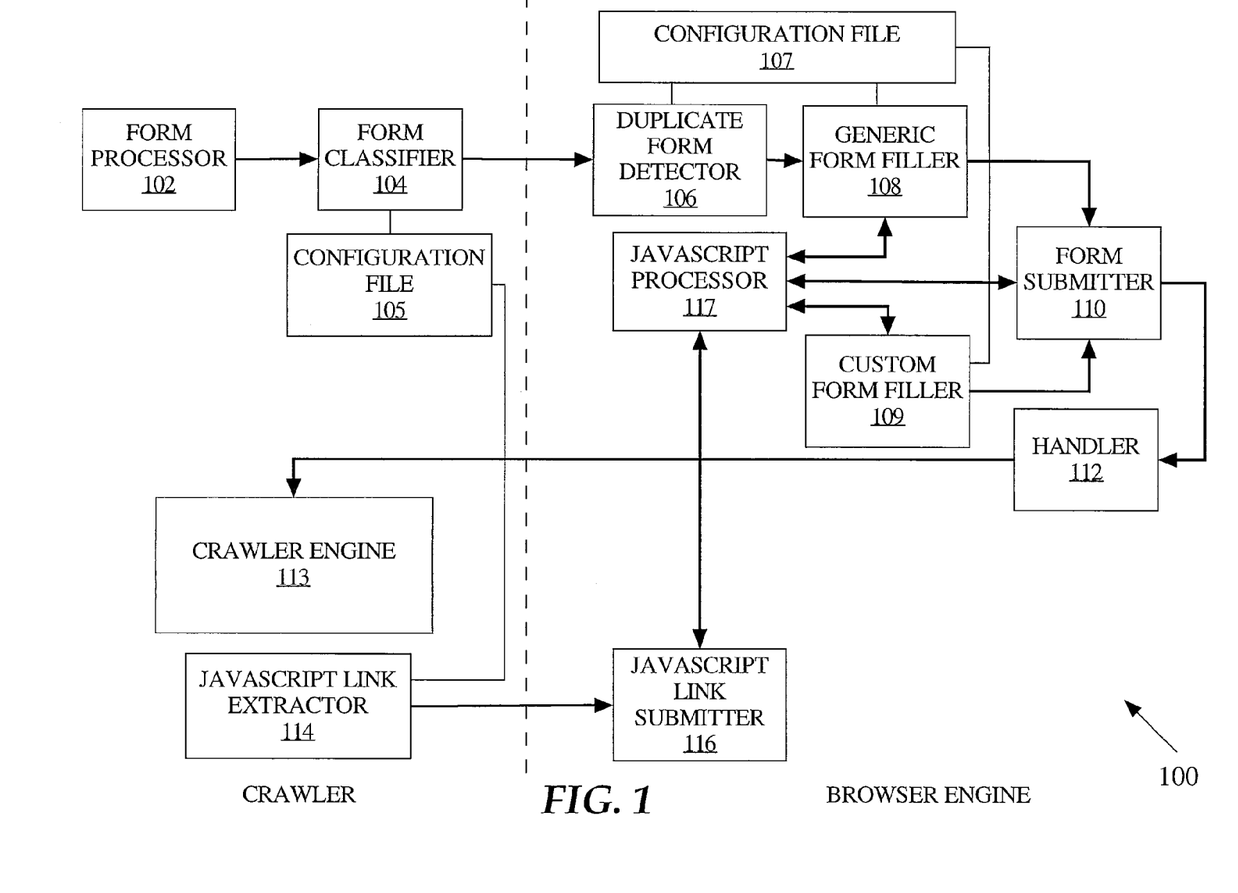
FIG. 1 is a block diagram that illustrates a software system architecture, according to which an embodiment of the invention may be implemented.

FIG. 1 is a block diagram that illustrates a software system architecture 100, according to which an embodiment of the invention may be implemented. FIG. 1 illustrates a conventional web crawler with the following plug-ins, the functionality of each of which is described herein: form processor 102, form classifier 104, crawler engine 113, and JavaScript link extractor 114. FIG. 1 illustrates a browser engine with the following plug-ins, the functionality of each of which is described herein: duplicate form detector 106, generic form filler 108, custom form filler 109, form submitter 110, handler 112, and JavaScript link submitter 116, as well as a JavaScript processor 117.

The software system architecture in which embodiments of the invention are implemented may vary. FIG. 1 is one example of an architecture in which plug-in modules are integrated with a conventional web crawler and a browser engine which, in one implementation, functions like a conventional web browser without a user interface (also referred to as a "headless browser").

Automatic Form Filling

As mentioned, when crawling the web, a web crawler follows hyperlinks (referred to hereafter simply as "links") from web page to web page in order to index the content of each page. As part of the crawling process, crawlers typically parse the HTML document underlying each page, and build a DOM (Document Object Model) that represents the objects in the page. A DOM defines what attributes are associated with each object, and how the objects and attributes can be manipulated.

Generally, the crawler engine 113 is capable of detecting web pages that contain an information submission mechanism that requires insertion of information to request dynamic content. For example, such a web page contains an HTML form through which information is submitted to a backend database in order to request content from the database. In the domain of job service web pages, for example, the form may provide for submission of information to identify the type of jobs (e.g., engineering, legal, human resources, accounting, etc.) that a user is interested in viewing, and the location of such jobs (e.g., city, state, country).

In one embodiment, the crawler engine 113 detects the presence of a form in a web page from analysis of the corresponding DOM. For example, the crawler detects a <FORM> tag in the HTML code as represented in the DOM. The term "form" is used hereafter in reference to any type of information submission mechanism contained within code for a web page, for facilitating submission of requests to a server for dynamic web content. An HTML form is one example of an information submission mechanism that is currently commonly used. However, embodiments of the invention are not limited to use in the context of HTML and HTML forms. Hence, the broad techniques described herein for crawling dynamically generated network content can be readily adapted by one skilled in the art to work in the context of other languages in which pages are coded, such as variations of HTML, XML, and the like, and to work in the context of other electronic form mechanisms other than those specified by the <FORM> tag, including such mechanisms not yet known or developed.

In response to detecting a form in a web page, form processor 102 is invoked by crawler engine 113.

Form Processor

A crawler-based form processor 102 is passed information from the crawler engine 113 in response to the detection of a form. For example, the form processor 102 may receive the URL of the web page that contains an HTML form and the DOM that represents the page, The form processor 102 may receive other useful information, such as information that identifies the location of one or more forms in the DOM. Form processor 102 initiates processing of the form for purposes of crawling dynamic content accessible via the form. In one embodiment, form processor 102 initializes the browser engine that performs further processing of forms identified by the crawler.

Form processor 102 passes information to form classifier 104, such as the URL of the web page that contains the form and the DOM that represents the page, and information that identifies the location of one or more forms in the DOM.

Form Classifier

A crawler-based form classifier 104 uses heuristics to determine whether the identified web page is domain specific, and classifies the domain for indexing and other purposes. For example, the form classifier may classify a set of dynamic content, and the web page through which the set of dynamic content is reached, as being in job services domain, travel services domain, automobile services domain, and the like. Classification of the domain of the form provides valuable information for guiding the crawler engine 113 as to what domains to crawl (referred to as a "focused crawl") and, therefore, assigning and managing crawler resources. For example, one might wish to devote crawler resources (e.g., processing time and hardware resources) to crawling travel services and automobile services domains, but not job services or "blog" (web log) domains.

In one embodiment, form classifier 104 analyzes information associated with the form (e.g., form metadata) and compares such information with a configuration file 105 containing domain-specific terms, in an attempt to classify the form to a particular domain. In one embodiment, form classifier 104 examines one or more of the following, from the DOM: (a) the name of the form, (b) the name of fields in the form, (c) objects and attributes near the "submit" button, (d) anchor text, and the like. For example, if form classifier 104 identifies fields within the form that are named "model" and "make", then form classifier 104 may determine that the form is in the automobile services domain by referencing a mapping of terms to domains from the configuration file 105.

Duplicate Form Detector

Moving to the browser engine side of FIG. 1, a browser-based duplicate form detector 106 is invoked to identify duplicate forms. That is, the duplicate form detector 106 determines whether the form currently being processed is a duplicate of another form that has already been processed by the browser engine in furtherance of crawling dynamic web content, even if the duplicate versions of the form are from different pages.

In one embodiment, duplicate form detector 106 examines form metadata (such as that examined by form classifier 104, described above) and compares such information with a dynamic knowledge base, in an attempt to identify duplicate forms. The dynamic knowledge base data is dynamic and built on the fly, as the crawler operates, and contains similar form metadata for previously processed forms. In a related embodiment, the form metadata for each form is hashed (i.e., input to a hash function), and the output is stored in configuration file 107. In this scenario, configuration file 107 is a dynamic, rather than static, configuration file. Duplicate form detector 106 compares the hash value for the metadata for the form currently being processed, with the hash values stored in configuration file 107, to determine whether the form is a duplicate form.

When a duplicate form is identified, processing can terminate with respect to that form because that form was already processed. Consequently, the number of forms processed by the browser engine is minimized and, therefore, resources are managed efficiently and effectively.

Processing passes from duplicate form detector to either of the generic form filler 108 or the custom form filler 109, which function as follows.

Generic Form Filler

Browser engine-based generic form filler 108 systematically processes all of the combinations of options presented by the form. That is, the generic form filler 108 completes (i.e., "fills in") the form fields with the various search parameter values ("control values") that are presented in association with the form, such as the cities and states for the jobs services domain, or the year, make and model for the automobile services domain. This generic form filler 108 can systematically exercise each of the various search parameter fields by systematically requesting each of the available control values presented by the web page, such as options presented through pull-down menus, checkboxes, radio buttons, and the like. The options presented by the web page are present in the HTML or other code for the web page.

In one embodiment, for each and every combination of control values for the form fields, generic form filler 108 passes a set of information to form submitter 110, for construction of a dynamic content request message. The set of information includes the information needed to submit a valid request to the server, such as the URL of the server and the search parameters (also referred to as a "form data set") for the request.

Generic form filler 108 is also capable of detecting the presence of certain JavaScript functions that are required to submit the form, such as onsubmit( ), onclick( ), onselect( ), etc. In such scenarios, the generic form filler 108 invokes the JavaScript Processor 117 for executing the pertinent JavaScript function. The result of such JavaScript functions could either submit the form (e.g., onsubmit( )) or change the DOM (e.g., onselect( )).

Custom Form Filler

Some domain-specific sites may present some search parameter values that, for whatever reason, are not associated with pages of interest for crawling. Hence, it may be desirable to process only a subset of all the combinations of search parameter values, for form submission purposes. Further, a form may present an <ALL> option for a particular field which, when used, would duplicate processing that is otherwise performed with the systematic submissions of the form. Hence, it may be desirable to avoid processing a form submission for the field having the <ALL> option, to avoid duplicate submissions. In addition, a form may present an <ANY> option, another such keyword that may be desirable to avoid. This set of keywords can be specified in a configuration file 107, since such keywords are often domain specific.

Browser engine-based custom form filler 109 systematically processes a customized set of the combinations of options presented by the form. That is, the custom form filler 109 completes (i.e., "fills in") the form fields with some, but not necessarily all, the various search parameter values ("control values") that are presented in association with the form. This custom form filler 109 can systematically exercise a subset of the various search parameter fields by systematically requesting some of the available control values presented by the web page. Instructions as to which parameter values to submit or not submit can be included in a configuration file 107, for reference by custom form filler 109 in determining how to complete the form.

As with generic form filler 108, custom form filler 109 passes a set of information to form submitter 110, for construction of a dynamic content request message. For each form submission, the set of information describes the combination of control values for the form fields, i.e., the form data set.

As with generic form filler 108, custom form filler 109 is capable of detecting certain JavaScript functions that are required to submit the form, such as onsubmit( ), onclick( ), onselect( ), etc. In such scenarios, the custom form filler 109 invokes the JavaScript Processor 117 for executing the pertinent JavaScript function. The result of such JavaScript functions could either submit the form (e.g., onsubmit( )) or change the DOM (e.g., onselect( )).

Some forms include one or more fields that allow entry of text, i.e., search keywords. Use of keywords limits the domain of the particular search. Hence, keyword fields are not necessarily utilized when the generic form filler 108 and custom form filler 109 complete forms, because the crawler may be used to crawl the entire dynamic content that is reachable via the form, not a limited set of such content based on keywords. However, support is provided for using keywords when completing forms for submission, by storing, in a repository, keywords on which form submissions can be based.

In one embodiment, keywords on which form submissions can be based are stored in a configuration file, such as configuration file 107. Generic form filler 108 and custom form filler 109 can reference configuration file 107, in the process of completing forms for submission. That is, the keywords stored in configuration file 107 can be inserted into the text field by the form fillers, in combinations with parameter values associated with other fields within the same form.

Implementation of configuration file 107 may vary. That is, the various types of information referenced and used by duplicate form detector 106 (e.g., dynamic knowledge base, as form metadata), generic form filler 108 (e.g., keywords on which form submissions can be based), and custom form filler 109 (e.g., instructions as to which parameter values to submit and keywords on which form submissions can be based), may be contained in one or more global configuration files accessible to every module or may be contained in separate configuration files that are accessible only to the relevant modules for the associated purpose(s). Configuration file 107 is depicted in FIG. 1 as a single file for simplicity and clarity.

Form Submitter

The form submitter 110 employs conventional browser functionality in constructing request messages that are based on the available values for each control, as provided by the generic form filler 108 or the custom form filler 109. A successful control, which is valid for submission, has its control name paired with its current value as part of the form data set. Generally, form submissions to a server are different than conventional links to a server, such as a hyperlink, in that form submissions contain the form data set (e.g., user selections).

Each form submission message includes (1) the URL/URI of the host server that services such a request (e.g., the URI of a CGI program that executes on the server to interact with a requestor), along with (2) search parameter value(s) relative to particular dynamic content hosted by the server (e.g., an encoded form data set). An encoded form data set may be part of a URL/URI, such as when the form submission HTML code includes a METHOD="GET" command using, for example, form content type=application/x-www-form-urlencoded. Further, an encoded form data set may be part of an HTTP POST transaction using a request message to a form-specific URL/URI for the server, such as when the form submission HTML code includes a METHOD="POST" command using, for example, form content type=multipart/form-data. In addition, for each form submission, the associated cookies may be different, and may uniquely identify the requested response from the server.

Form submitter 110 submits each completed form passed in from the generic form filler 108 or the custom form filler 109 as if the form were being submitted to the back-end server to request the associated dynamic content. That is, a request message to the server is constructed to request particular dynamic web content based on a set of control values contained in an encoded form data set. However, the request message is not actually submitted to the server by the form submitter at this point in the process. Rather, browser-based handler 112 intercepts or receives the message that encapsulates the encoded form data set.

Handler

The handler 112 collects the various request messages "submitted" by form submitter 110, for providing the requests to the crawler engine 113 for execution against the host server. Thus, the request can actually be submitted to the host server by the crawler engine 113, which can then further crawl links in pages returned by the server in response to submission of the request. Execution of the request messages, i.e., submission of the forms with encoded data sets, results in the return of the requested dynamic content. The dynamic content can then be indexed according to conventional search engine indexing techniques.

In one embodiment, indexing includes associating the dynamic content with the specific domain to which the set of dynamic content was classified. In another embodiment, indexing includes associating the dynamic content with one or more keywords from a form text field, which were included in the corresponding request message.

Automatic Script Execution

In the context of automatic script execution, embodiments of the invention are not limited to processing only JavaScript functions. Rather, processing other browser-side scripting language functions, such as VBScript functions, can be automatically processed and executed using the techniques described herein. Thus, the types of scripts that are processed using these techniques are not limited, and may vary from implementation to implementation, from web site to web site. However, since JavaScript is currently a common browser-side scripting language, the description hereafter simply refers to JavaScript, even though applicable to any other browser-executed language, currently known or developed in the future.

Submission of some forms, to request dynamic web content, requires execution of JavaScript, or other scripting language, functions rather than a simple HTML <SUBMIT> operation. JavaScript-based forms may require execution of one or more JavaScript functions in order to, for example, manipulate control data (e.g., search parameter values) prior to submission of the form, and/or submit the form to the host server (e.g., execute onsubmit( ) function or onclick( ) function). Further, some web sites require execution of JavaScript functions that lead to a simple url/link being fetched, without a form involved. A JavaScript function typically takes input from a user or from the web page, manipulates the input, and submits the resultant form data set to the server to request dynamic content.

For example, in the context of an automobile services site, a requester may type in an automobile maker, and execution of a JavaScript results in presentation of the automobile models associated with that maker. The requester may then select a presented model and submit the form, and the JavaScript may encode the form data set in a server-specific format and submit the encoded data set to the server in order to complete the request for dynamic content. With the techniques described herein, the "requester" is an automated agent (e.g., JavaScript link submitter 116) that does not require actual user input.

Javascript Link Extractor

A crawler-based JavaScript (JS) link extractor 114 determines which JavaScript links need to be executed. Similar to the form processor 102, JS link extractor 114 examines the DOM constructed for a given web page. Using the DOM, JS link extractor 114 examines the objects surrounding any JavaScript links, to determine whether or not the JavaScript link is a relevant link for execution. For example, in one embodiment, JS link extractor 114 examines anchor text (i.e., the text associated with the link), and the actual link, to determine whether or not the link is relevant. The relevancy is determined by comparing such information with information in a configuration file, such as configuration file 105. Configuration file 105 is used to specify text to look for in a link or in anchor text, which may indicate that the link is a relevant link of interest for crawling dynamic content.

Implementation of configuration file 105 may vary. That is, the various types of information referenced and used by form classifier 104 (e.g., domain-specific terms) and JavaScript link extractor 114 (e.g., information regarding relevant links), may be contained in one or more global configuration files accessible to every module or may be contained in separate configuration files that are accessible only to the relevant modules for the associated purpose(s). Configuration file 105 is depicted in FIG. 1 as a single file for simplicity and clarity.

In response to identifying a JavaScript link, JS link extractor 114 passes the link, or a suitable link identifier associated with the DOM, to the browser engine-based JavaScript link submitter 116.

Javascript Link Submitter

The browser engine-based JavaScript (JS) link submitter 116 receives the link from the crawler-based JS link extractor 114. JS link submitter 116 recognizes JavaScript links and calls the JavaScript processor 117 to execute associated JavaScript code according to conventional browser-based technology. Further, JS processor 117 may execute link-fetching JavaScript, from which a resulting link may be returned to JS link submitter 116 for traversal of the link.

Javascript Processor

The browser engine-based JavaScript (JS) processor 117 is a component in the browser engine that is capable of executing JavaScript. JS processor 117 receives JavaScript links from JS link submitter 116. For example, JS processor 117 executes form submission JavaScript, from which results are forwarded to form submitter 110 for submission, and interception by handler 112. Similarly, JS processor 117 can execute link-fetching JavaScript, from which resulting links may be returned to JS link submitter 116 for traversal of the links, or from which results are a form that is forwarded to form submitter 110 for submission.

Similarly to the process with form submitter 110 and handler 112, handler 112 collects the various request messages submitted by JavaScript processor 117, for providing the requests to the crawler engine 113 for execution against the host server. Thus, the request can actually be submitted to the host server by the crawler engine 113, which can then further crawl links in pages returned by the server in response to submission of the request. Again, execution of the request messages, i.e., submission of the forms with encoded data sets, results in the return of the requested dynamic content, which can then be indexed according to conventional search engine indexing techniques.

A Process for Crawling Dynamic Web Content

Figure 2:
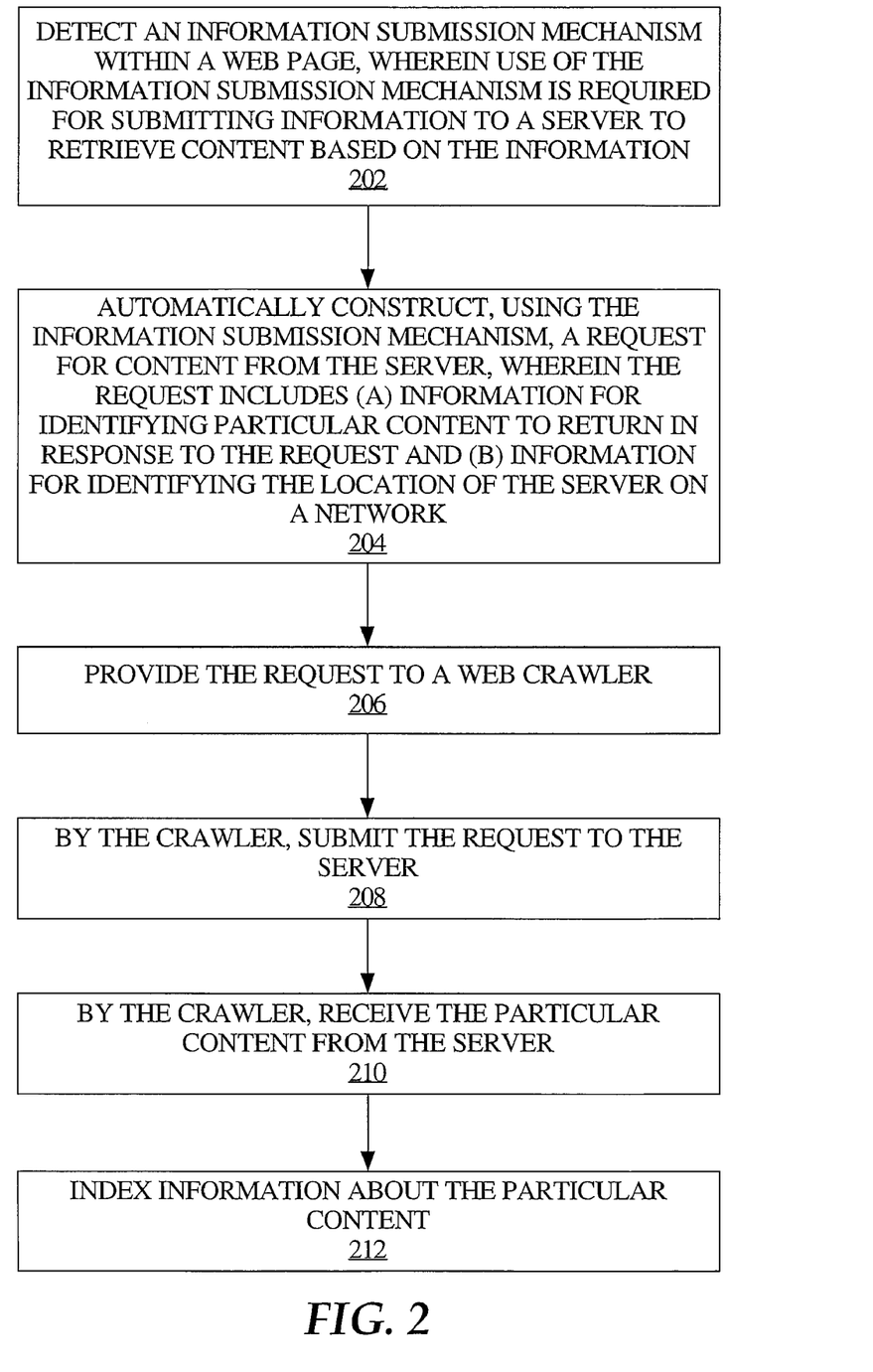
FIG. 2 is a flow diagram that illustrates an automated computer-implemented process for enabling a web crawler to crawl dynamic web content, according to an embodiment of the invention.

FIG. 2 is a flow diagram that illustrates an automated computer-implemented process for enabling a web crawler to crawl dynamic web content, according to an embodiment of the invention. In one embodiment, the process illustrated in FIG. 2 is implemented for automated performance by a conventional computing system, such as computer system 300 of FIG. 3. Further, in one embodiment, the process illustrated in FIG. 2 is implemented for automated performance within a software system architecture, such as system architecture 100 of FIG. 1.

At block 202, an information submission mechanism is detected within a web page, where use of the information submission mechanism is required for submitting information to a server to retrieve content based on the information. For example, web crawler engine 113 (FIG. 1) detects an HTML form by examining an electronically-represented DOM constructed for a web page, where such detection triggers form processor 102 to initiate processing of the form and/or JS link extractor 114 (FIG. 1) to extract one or more JS links from the form, as described herein.

At block 204, using the information submission mechanism, a request for content from the server is automatically constructed. As described herein, the request includes (A) information for identifying particular content to return in response to the request (e.g., a form data set) and (B) information for identifying the location of the server on a network (e.g., a URL or URI). For example, form submitter 110 (FIG. 1) constructs a request based on input from generic form filler 108 or custom form filler 109 (FIG. 1). For another example, JS link submitter 116 (FIG. 1) constructs a JavaScript-based request for execution by JavaScript processor 117 (FIG. 1), based on a JavaScript link that is embedded within the web page and that was passed from JS link extractor 114 (FIG. 1).

At block 206, the request is provided to the web crawler. For example, handler 112 (FIG. 1) intercepts the request submitted by form submitter 110 or JS processor 117 before the request reaches the server, and passes the request to the crawler engine 113 (FIG. 1).

In one embodiment, at block 208, the crawler actually submits the request to the server and, at block 210, the crawler receives the results (i.e., the particular content) from the server in response to submission of the request. Hence, in one embodiment, at block 212, information about the particular content is indexed. For example, a conventional indexing mechanism within the crawler or within the search engine indexes the dynamic content so that the dynamic content is subsequently searchable via searches from the search engine, and retrievable by a browser via links returned by the search engine in response to such searches.

Hardware Overview

Figure 3:
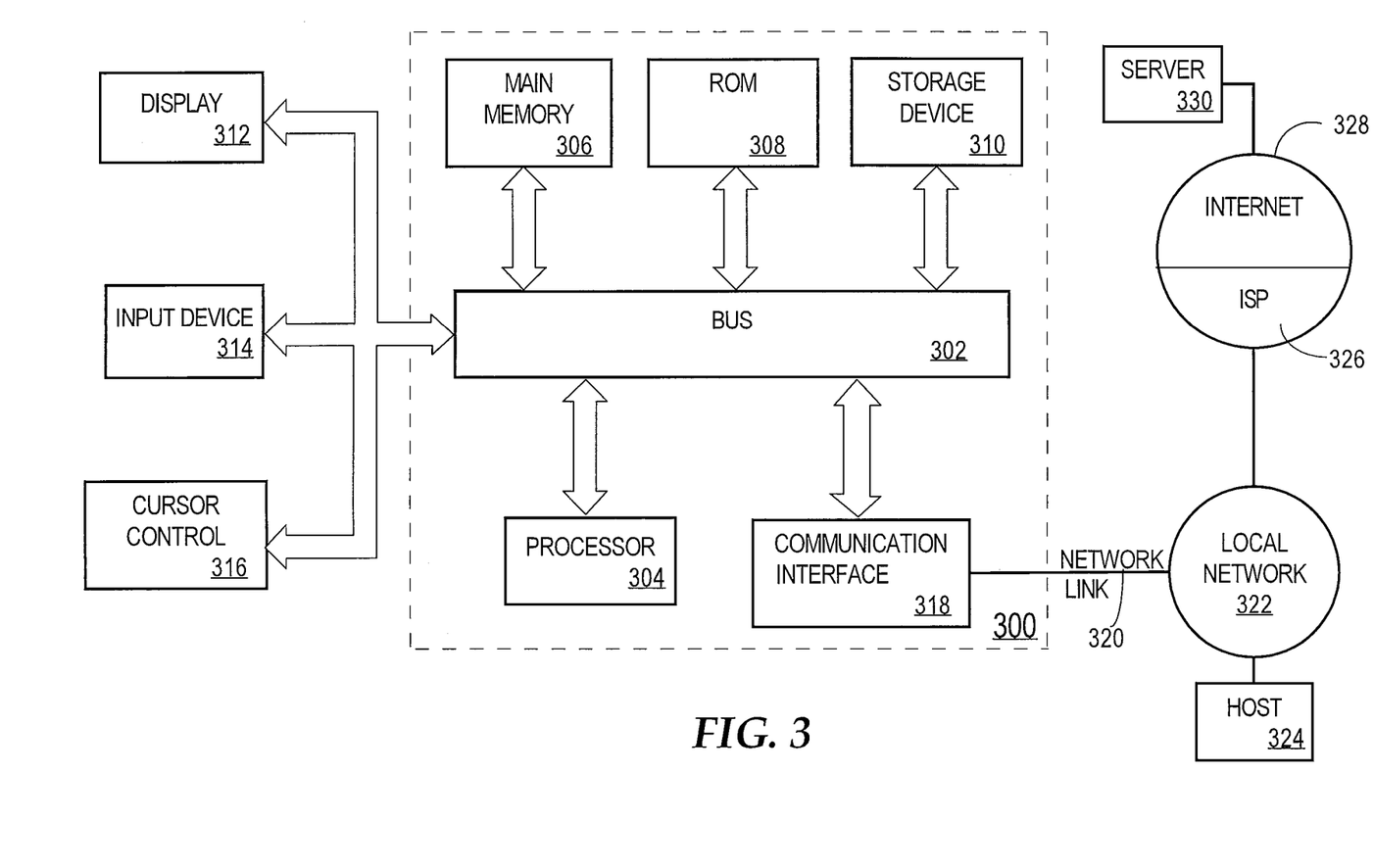
FIG. 3 is a block diagram that illustrates a computer system 300 upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Alternative embodiments of the invention are described throughout the foregoing specification, and in locations that best facilitate understanding the context of the embodiments. Furthermore, the invention has been described with reference to specific embodiments thereof. It will, however, be evident that various modifications and changes may be made thereto without departing from the broader spirit and scope of the invention.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for crawling content, comprising:
   identifying a first information submission mechanism in content that is being processed by a crawler, wherein processing of the first information submission mechanism requires the crawler to construct a plurality of requests for dynamic content based at least upon the first information submission mechanism;
   determining that the first information submission mechanism is a duplicate version of a second information submission mechanism that has already been processed;
   wherein determining that the first information submission mechanism is a duplicate version of the second information submission mechanism comprises:
      determining that the first information submission mechanism comprises first metadata that is similar to second metadata that the second information submission mechanism comprises;
   in response to determining that the first information submission mechanism is a duplicate version of the second information submission mechanism, terminating processing of the first information submission mechanism;
   wherein the method is performed by one or more processors at one or more computing devices.

2. The method of claim 1, wherein determining that the first information submission mechanism is a duplicate version of the second information submission mechanism comprises:
   determining that the first information submission mechanism is a duplicate of the second information submission mechanism.

3. A machine-readable storage medium storing one or more sequences of instructions which, when executed by one or more processors, causes the one or more processors to perform the method recited in claim 2.

4. The method of claim 1, wherein the first information submission mechanism is a form, said form being implemented in at least one of JavaScript, Flash, or HTML.

5. A machine-readable storage medium storing one or more sequences of instructions which, when executed by one or more processors, causes the one or more processors to perform the method recited in claim 4.

6. The method of claim 1, wherein, in response to determining that the first information submission mechanism is a duplicate version of the second information submission mechanism, the crawler processes the content without constructing the plurality of requests.

7. A machine-readable storage medium storing one or more sequences of instructions which, when executed by one or more processors, causes the one or more processors to perform the method recited in claim 6.

8. A machine-readable storage medium storing one or more sequences of instructions which, when executed by one or more processors, causes the one or more processors to perform the method recited in claim 1.

9. The method of claim 1, wherein first metadata and the second metadata comprise one or more of: an information submission mechanism name, information submission mechanism field names, objects and attributes near an information submission mechanism submit button, information submission mechanism anchor text.

10. A machine-readable storage medium storing one or more sequences of instructions which, when executed by one or more processors, causes the one or more processors to perform the method recited in claim 9.

11. The method of claim 1, wherein the first information submission mechanism and the second information submission mechanism are both within the same web page.

12. A machine-readable storage medium storing one or more sequences of instructions which, when executed by one or more processors, causes the one or more processors to perform the method recited in claim 11.

13. The method of claim 1, wherein determining that the first form comprises first metadata that is similar to the second metadata comprises: inputting the first metadata into a hash function, inputting the second metadata into a hash function, and comparing the hashed first metadata to the hashed second metadata.

14. A machine-readable storage medium storing one or more sequences of instructions which, when executed by one or more processors, causes the one or more processors to perform the method recited in claim 13.

15. A method for crawling dynamic content, the method comprising:
 while crawling a first page:
 detecting a first form within the first web page;
 in response to detecting the first form, crawling the first form by constructing a plurality of requests for dynamic content from the server, based at least on the form;
 while crawling a second page that is different from the first page, subsequent to detecting the first form:
 detecting a second form within the second web page;
 determining that the second form is a duplicate version of the first form;
 wherein determining that the first form is a duplicate version of the second form comprises:
 determining that the first form comprises first metadata that is similar to second metadata that the second form comprises;
 in response to determining that the second form is a duplicate version of the first form, determining not to crawl the second form;
 wherein the method is performed by one or more processors at one or more computing devices.

16. The method of claim 15, wherein the first page and the second page are both web pages at a same site.

17. A machine-readable storage medium storing one or more sequences of instructions which, when executed by one or more processors, causes the one or more processors to perform the method recited in claim 16.

18. The method of claim 15, the method further comprising:
 in response to crawling the first form or detecting the first form, storing data indicating the first form in a knowledge base;
 wherein determining that the second form is a duplicate version of the first form comprises accessing the data in the knowledge base.

19. The method of claim 18, wherein storing data indicating the first form comprises:
 generating a first hash value based on first metadata for the first form; and
 storing the first hash value in the knowledge base;
 wherein determining that the second form is a duplicate version of the first form comprises:
 generating a second hash value based on second metadata for the second form; and
 determining that the knowledge base already includes the second hash value;
 wherein the second hash value is the same as the first hash value.

20. A machine-readable storage medium storing one or more sequences of instructions which, when executed by one or more processors, causes the one or more processors to perform the method recited in claim 19.

21. A machine-readable storage medium storing one or more sequences of instructions which, when executed by one or more processors, causes the one or more processors to perform the method recited in claim 18.

22. The method of claim 15, wherein the form is one of JavaScript-based, Flash, or HTML form.

23. A machine-readable storage medium storing one or more sequences of instructions which, when executed by one or more processors, causes the one or more processors to perform the method recited in claim 22.

24. A machine-readable storage medium storing one or more sequences of instructions which, when executed by one or more processors, causes the one or more processors to perform the method recited in claim 15.

25. The method of claim 15, wherein first metadata and the second metadata comprise one or more of: a form name, form field names, objects and attributes near a form submit button, form anchor text.

26. A machine-readable storage medium storing one or more sequences of instructions which, when executed by one or more processors, causes the one or more processors to perform the method recited in claim 25.

27. A method of crawling content, the method comprising:
 identifying one or more JavaScript links within a page being crawled by a crawler, each JavaScript link being associated with executable JavaScript code;
 for each link of the one or more JavaScript links, determining whether or not the crawler should execute code associated with the link;
 wherein determining whether or not the web crawler should execute the code comprises:
 comparing information about the link to configuration information to determine the relevancy of the link, wherein the information about the link includes at least one of link text, anchor text, or information about an object near the link;
 based on the comparing, determining to execute particular code referenced in a particular JavaScript link;
 based on executing the particular code, identifying one or more additional pages for the crawler to crawl;
 wherein the method is performed by one or more processors at one or more computing device.

28. A machine-readable storage medium storing one or more sequences of instructions which, when executed by one or more processors, causes the one or more processors to perform the method recited in claim 27.

* * * * *